United States Patent [19]
Bristowe

[11] Patent Number: 4,734,486
[45] Date of Patent: Mar. 29, 1988

[54] POLYAMIDE COMPRISING FLUORINATED XYLYENE MOIETIES

[75] Inventor: William W. Bristowe, Wilmington, Del.

[73] Assignee: ICI Americas Inc., Wilmington, Del.

[21] Appl. No.: 145

[22] Filed: Jan. 2, 1987

[51] Int. Cl.$^4$ ...................... C08G 69/26; C08G 69/32
[52] U.S. Cl. ...................................... 528/347; 528/70; 528/84; 528/340; 528/348
[58] Field of Search ................. 528/347, 348, 340, 70, 528/84

[56] References Cited
U.S. PATENT DOCUMENTS 3,446,845  5/1969  Gale ...................................... 528/347

Primary Examiner—Harold D. Anderson

[57] ABSTRACT

Polyamide polymers are made by reacting fluorinated xylylene diamine or the corresponding isocyanate derivatives with polycarboxylic moieties such as anhydrides or acid chlorides. The polymers thus formed may be cast into films having superior impermiability to gases and moisture.

7 Claims, No Drawings

POLYAMIDE COMPRISING FLUORINATED XYLYENE MOIETIES

The invention relates a novel class of polymers which can be used in the form of fibers, encapsulates and films which are excellent in inhibiting the transmission of gases such as oxygen, carbon dioxide, nitrogen and water vapor. Of particular interest are the polyamides formed from xylylene diamine having 1 to 4 fluorine atoms attached to the aromatic ring.

There is need for a polymer which has excellent barrier properties, superb clarity and excellent toughness. Furthermore, the polymer must be workable by fabrication through solution processing, melt processable into a self supporting film or moldable into a shaped form or spun into a fiber. Resistance to water vapor transmission is important in electronic industries especially with electronic encapsulates. Because of their high degree of crystallanity conventional 6 nylon and 6,6-nylon polyamide derivatives and their relatives are lacking in some of these desired properties and yield products which are opaque.

Surprisingly it has been found that fluorinated xylylene diamines when appropriately reacted with special chemical moieties form products which meet all the above desired fabrication and physical properties and can be made into clear films.

It is therefore an object of the invention to provide for film and fiber forming polyamide resins comprising recurrent units having the general formula I (See Table of Formulas) wherein n is an integer greater than 1, A is a divalent alkyl or aryl radical having 4–18 carbon atoms, and B is at least 50 mol percent of a fluorinated xylylene radical having the formula II wherein x is 1–4.

In general the polyamides of the invention are prepared by reacting polycarboxylic acids, their esters and anhydrides with fluorinated xylylene diamine compounds of formula III wherein x has a value of 1–4 wherein the aminomethyl groups on the ring are located in the meta or para positions. These can be reacted directly by meltpolymerization techniques, solvent polymerization techniques or interfacial polymerization employing dibasic acid halides.

The xylylene diamines of formula III are derived from the corresponding fluorinated isocyanatomethyl derivatives which are reduced by mild hydrogenation to the corresponding aminomethyl derivatives.

The tetrafluorinated p xylylene diamine is the most useful raw material and can be prepared according to the procedure disclosed in British patent No. 2,134,109 to P. J. Richardson and G. R. Davies. The presence of the fluorine atoms creates a molecular unit which permits close packing of the polymer to reduce the diffusivity of gaseous products as well as water vapors through its structure. Furthermore, the solubility of gaseous products and water vapor in these polymers is drastically reduced.

Other diamines may be used in combination with the fluorinated xylylene diamines to control crystallinity and to aid in processibility. Up to 50 mol percent of the fluorinated diamine used to form the B moiety in Formula I may be replaced by nonfluorinated reagents in formulating the polyamide polymers of the invention. Such replacement amines can be selected from polyamines and especially diamines selected from alkylene, alkenyl and aromatic polyamines having up to about 18 carbon atoms and which may be represented by the ethylenediamine, propylenediamine, butylenediamine, hexamethylenediamine, m-phenylenediamine, 2,4-toluenediamine, 2,6-toluenediamine and mixtures of the 2,4- and 2,6-toluenediamine. 1,4-naphthylenediamine, 2,2-(4,4-diaminodiphenyl)-propane, 4,4-diaminobenzophenone, 3,3-dimethyl-4,4-diaminodiphenylmethane, 3,3-diaminodiphenylmethane, 2,5-dimethyl piperazine, 2,2,4-trimethyl-1,6-diaminohexane, 2,4,4-trimethyl-1,6-diaminohexane, and mixtures thereof.

The fluorinated aromatic diamines may be used alone or in combination with other diamines and reacted with a dibasic acid, anhydride or acid chloride having up to about 18 carbon atoms. The preferred acids or combination are those which have a reduced tendency to crystallize in the resulting polymer. Illustrative examples are given of the following formula radical of a dibasic acid —CO—R—CO—where R is m-phenylene, cis-hexahydroterephthalic cis-hexahydroisophthalic, cis-hexahydrobisbenzoic, cis-1,3-cyclopentylene, napthylene and a dibasic acid radical having the formula R'[PhCO$_2$]$_2$ wherein R' may be —O—, —CH$_2$—, —CH$_2$CH$_2$—, —C(CH$_3$)$_2$—, —SO$_2$—, —OCH$_2$CH$_2$—O—, —Si(CH$_3$)$_2$—, —PO(CH$_3$)—, —PO (C$_6$H$_6$)—, and Ph is p-phenylene.

Resins having chemical formula I may also be prepared by reacting equivalent diisocyanates in place of diamines. In this method the isocyanate is reacted with the dibasic acid component in solution. The procedure is outlined in U.S. Pat. No. 4,007,481 wherein special nonreactive solvents and catalysts are employed. Carbon dioxide evolves from the reaction and has a tendency to create foams.

Suitable other methods for polymerizing the amines to form a resin are melt polymerization, solution polymerization and interfacial polymerization. In the melt polymerization method the reactants may be employed as diamines and dibasic acids and may be polymerized directly or by a more preferred route which requires the production of a diamine/dibasic acid salt intermediate followed by melt polymerization. The latter will compensate for drastic differences in physical properties of the starting raw materials such as melting points and boiling points.

The solution polymerization process requires a mutual solvent for the reactants as well as the polymer which results. The latter is a requirement to obtain high molecular weight polymers especially when the diamine is to be reacted with the dibasic acid. Preferred solvents are dimethyl formamide, dimethyl acetamide, dimethyl sulfoxide, cresol, dimethyl formamide containing 5% lithium chloride, N,N,N',N'-tetramethylurea, and n-methyl pyrrolidone. The polymer may be cast directly or precipitated into a fluid. Suitable fluids are alcohols, ketones, petroleum ethers and water. Water is especially preferred.

A preferred method of preparation involves interfacial polymerization. The fluorinated diamine and optionally other diamines are dissolved or dispersed in a water containing base. The base is used in sufficient quantities to neutralize the acid involved during polymerization. The dibasic acid component is employed in the dibasic halide form. The acid chloride form is preferred and is dissolved in a suitable solvent. Preferred solvents are tetrachloroethylene, methylenechloride and chloroform. The diamine, base and water are added together and vigorously stirred. High shearing action of the stirrer is important. The solution of acid chloride is added to the aqueous slurry. Polymerization occurs rapidly.

The polymer is first melted and then extruded into a film, a fiber or injected molded or may be cast into a film using solution casting. A critical feature in the film forming operation is to obtain void free films.

Barrier properties for cast films are measured in a typical procedure. The methods described by Charch and Scroggie "Paper Tray Journal", 101, 31–9(1935) and again by Morgan, "Industrial and Engineering Chemistry" 45, 2296–2306(1953) and "Modern Plastics" 157–158(May, 19857) and Brown and Sauber, "Modern Plastics" 107–116(August, 1959) are suitable methods.

Additives such as antioxidants, dyes, fire retardants and the like may be added to solutions of the polymers of the present invention and solvents of the type set forth above. Alternatively, the additives may be added to the dry powder polymers either prior to or during processing steps such as molding, extruding or injection molding and the like.

The solid polymers can be used in bushings, seal faces, electric insulators, compressor veins and impellers, brake linings, clutch faces, and in abrasive articles. Coatings of the copolyamides of the present invention are applied as wire coating, and as sprayed films on a variety of substrates such as metal, ceramic, fabrics, polymerics and the like.

The following examples will serve to illustrate the process for making and using the polymer of the invention and are not considered to be limiting thereof. All proportions expressed are percent by weight unless otherwise specified.

EXAMPLE 1

POLYISOPHTHALOYL TETRAFLUOROXYLYLENEDIAMINE BY THE SOLUTION POLYCONDENSATION PROCESS.

4.16 g of Tetrafluoroxylylenediamine (FW=208) and 5.6 ml of pure triethylamine were placed in 100 ml of washed chloroform in a 500 ml Erlenmeyer flask. To this mixture was added a solution of 4.06 g of isophthaloyl chloride (FW=203) in 80 cc of chloroform with swirling. Additional chloroform (30 ml) was employed to ensure all the reactants were contacted. The mixture reacted as evidenced by a temperature increase from 25° C. to 45° C. The resulting polymer was isolated and proved to be polyisophthaloyl-tetrafluoroxylylenediamine. The yield was high. The crystallinity was relatively low as measured with x-ray diffraction techniques.

EXAMPLE 2

POLYAMIDE FROM TETRAFLUOROXYLYLENEDIAMINE AND CIS-HEXAHYDROTEREPHTHALOYL CHLORIDE/TRANS-HEXAHYDROTEREPHTHALOYL CHLORIDE BY INTERFACIAL PROCESS.

To an ice cooled mixture consisting of 2.5 l of water, 1 mole of sodium carbonate, 0.50 moles of tetrafluoroxylylenediamine, one liter of methylene chloride under vigorous stirring is added 0.415 mol cis-hexahydroterephthaloyl chloride and 0.085 mol trans-hexahydroterephthaloyl chloride in 0.5 liter of methylene chloride. Polymerization was rapid as judged by the rapid exotherm raising the temperature from 0° to 9° C. The yield was almost quantitative. The polymer was washed several times with water. Crystallinity is low as measured by x-ray.

EXAMPLE 3

POLYAMIDE FROM ADIPOYL CHLORIDE AND A MIXTURE OF TETRAFLUOROXYLYLENEDIAMINE AND METAPHENYLENE DIAMINE.

In a Waring blender were placed 143 ml of a 10% potassium carbonate - 10% potassium bicarbonate buffer solution and an aqueous solution containing 0.14 mol of tetrafluoroxylylenediamine and 0.014 mol of metaphenylene diamine. Thirty ml of methylene chloride was also added. The resulting mixture was an emulsion. It was cooled to 0° C. and stirred vigorously. To it was added 0.154 mol. of adipoyl chloride (FW=183) in 25 ml of methylene chloride. After 20 minutes the mixture was poured into 3 l of water, filtered, and washed 3x. The white granular polymer gave almost quantitative yield. Crystallinity was examined by x-ray techniques.

Film Barrier Properties

The products of examples 1–3 were dissolved in suitable solvents such as DMF and were cast from their viscous solutions onto glass plates. The solvent was removed by exhaustive evaporation followed by oven treatment at 100° C. for 2 hours and 140° C. for 4 hours. The films were examined for gas transmission properties namely, $O_2$, $N_2$ and $CO_2$ as well as water vapor transmission. Excellent barrier properties result.

TABLE OF FORMULAS

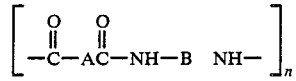

I

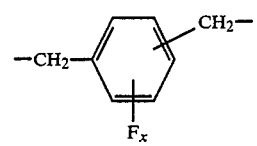

II

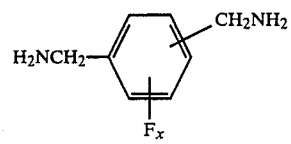

III

What is claimed is:

1. A polyamide polymer consisting essentially of the recurring units of Formula I wherein, A is a divalent alkylene or arylene radical having 4–18 carbon atoms, n is an integer greater than 1, B is a divalent alkylene or arylene radical having up to 19 carbon atoms and at least 50 mol percent fluorinated xylylene radical of Formula II, wherein x is an integer from 1 to 4 and wherein said Formulas are

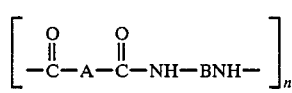

I

-continued
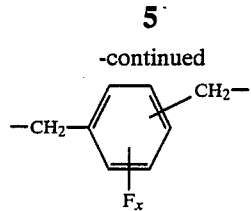
II
2. A polymer according to claim 1 wherein A comprises m-phenylene.
3. A polymer according to claim 1 wherein A is o-phenylene.
4. A polymer according to claim 1 wherein A is butylene radical.
5. A film cast from the polymer of claim 1.
6. A coating formulation comprising the polymer of claim 1.
7. An injection molded article of the polymer of claim 1.
* * * * *